United States Patent
Anderson et al.

(10) Patent No.: US 8,812,448 B1
(45) Date of Patent: Aug. 19, 2014

(54) COMPUTER IMPLEMENTED METHOD FOR ACCELERATING ELECTRONIC FILE MIGRATION FROM MULTIPLE SOURCES TO MULTIPLE DESTINATIONS

(71) Applicant: Access Sciences Corporation, Houston, TX (US)

(72) Inventors: Janice Carver Anderson, Houston, TX (US); Renu Susan Babu Hall, Houston, TX (US); Alex Daniel Williams, Houston, TX (US); John Ambrose Harold, Houston, TX (US); Anne Genevieve Tulek, Houston, TX (US)

(73) Assignee: Access Sciences Corporation, Houston, TX (US)

( * ) Notice: Subject to any disclaimer, the term of this patent is extended or adjusted under 35 U.S.C. 154(b) by 0 days.

(21) Appl. No.: 13/663,107

(22) Filed: Oct. 29, 2012

Related U.S. Application Data

(60) Provisional application No. 61/557,552, filed on Nov. 9, 2011.

(51) Int. Cl.
*G06F 17/30* (2006.01)
(52) U.S. Cl.
CPC .... *G06F 17/30126* (2013.01); *G06F 17/30221* (2013.01); *G06F 17/30079* (2013.01)
USPC ............ 707/654; 707/204; 707/610; 707/634
(58) Field of Classification Search
CPC .................... G06F 17/30126; G06F 17/30221; G06F 17/30079
USPC ........................................................ 707/654
See application file for complete search history.

(56) References Cited

U.S. PATENT DOCUMENTS

| | | | |
|---|---|---|---|
| 7,225,247 B2 | 5/2007 | Kennedy et al. | |
| 7,478,096 B2 | 1/2009 | Margolus et al. | |
| 7,502,891 B2 | 3/2009 | Shachor | |
| 7,512,636 B2 | 3/2009 | Verma et al. | |
| 7,792,945 B2 | 9/2010 | Paknad et al. | |
| 8,156,281 B1* | 4/2012 | Grosner et al. | 711/114 |
| 2003/0110237 A1* | 6/2003 | Kitamura et al. | 709/219 |
| 2005/0125463 A1* | 6/2005 | Joshi et al. | 707/204 |
| 2006/0212671 A1* | 9/2006 | Todd | 711/165 |
| 2007/0022129 A1* | 1/2007 | Bahar et al. | 707/100 |
| 2007/0055715 A1* | 3/2007 | Achiwa | 707/204 |
| 2007/0130423 A1* | 6/2007 | Liu et al. | 711/114 |
| 2008/0235300 A1* | 9/2008 | Nemoto et al. | 707/204 |
| 2009/0228531 A1* | 9/2009 | Baumann et al. | 707/204 |
| 2011/0213814 A1* | 9/2011 | Fukatani et al. | 707/827 |
| 2011/0276821 A1* | 11/2011 | Gudlavenkatasiva et al. | 714/3 |

OTHER PUBLICATIONS

Hurley, Richard T., and Soon Aun Yeap. "File migration and file replication: a symbiotic relationship." Parallel and Distributed Systems, IEEE Transactions on 7, No. 6 (1996): 578-586.*

* cited by examiner

*Primary Examiner* — Neveen Abel Jalil
*Assistant Examiner* — Kristofer Biskeborn
(74) *Attorney, Agent, or Firm* — Buskop Law Group, PC; Wendy Buskop

(57) ABSTRACT

A method for migrating source material comprising meta data and electronic file content from source location folders to destination location folders using an administrative processor with administrative data storage which can be based in a computing cloud to create a migration profile, a file inventory using only metadata and the migration profile, optionally copying electronic file content based on the file inventory, optionally simulating a migration; and then performing an actual migration using the migration profile and a migration management console.

7 Claims, 18 Drawing Sheets

FIGURE 2A

| | |
|---|---|
| DYNAMIC RULES GENERATION LIBRARY | 26 |
| EDITABLE CLASSIFICATION RULES | 28 |
| CLASSIFICATION COMPARISON RULES | 30 |
| CLASSIFICATION OPERATION RULES | 32 |
| CLASSIFICATION RULE VALUES | 34 |
| CLASSIFICATION TITLE | 36 |
| CLASSIFICATION RULE DESCRIPTIONS | 38 |
| CLASSIFICATION RULE ENTRIES | 29 |
| EDITABLE EXCLUSION RULES | 50 |
| EXCLUSION COMPARISON RULES | 52 |
| EXCLUSION OPERATION RULES | 54 |
| EXCLUSION RULE VALUES | 56 |
| EXCLUSION VALUE TITLES | 58 |
| EXCLUSION RULE DESCRIPTIONS | 60 |
| EXCLUSION RULE ENTRIES | 51 |
| OUTPUT SETTINGS | 76 |
| OUTPUT SYSTEM TYPE | 78 |
| OUTPUT SYSTEM ENVIRONMENT | 80 |
| OUTPUT SYSTEM DATA DESTINATION ROOT PATH | 82 |
| INCLUDE OUTPUT SUBFOLDERS INDICATOR | 84 |
| INDICATOR PROMPT TO RENAME MANUALLY | 86 |
| INDICATOR TO AUTO-REMOVE INVALID CHARACTERS | 88 |
| INPUT SETTINGS | 91 |
| INPUT SYSTEM TYPE | 93 |
| INPUT DATA SOURCE ENVIRONMENT | 95 |
| INPUT DATA SOURCE ENVIRONMENT ROOT PATH | 97 |
| INCLUDE INPUT DATA SUBFOLDERS INDICATOR | 99 |

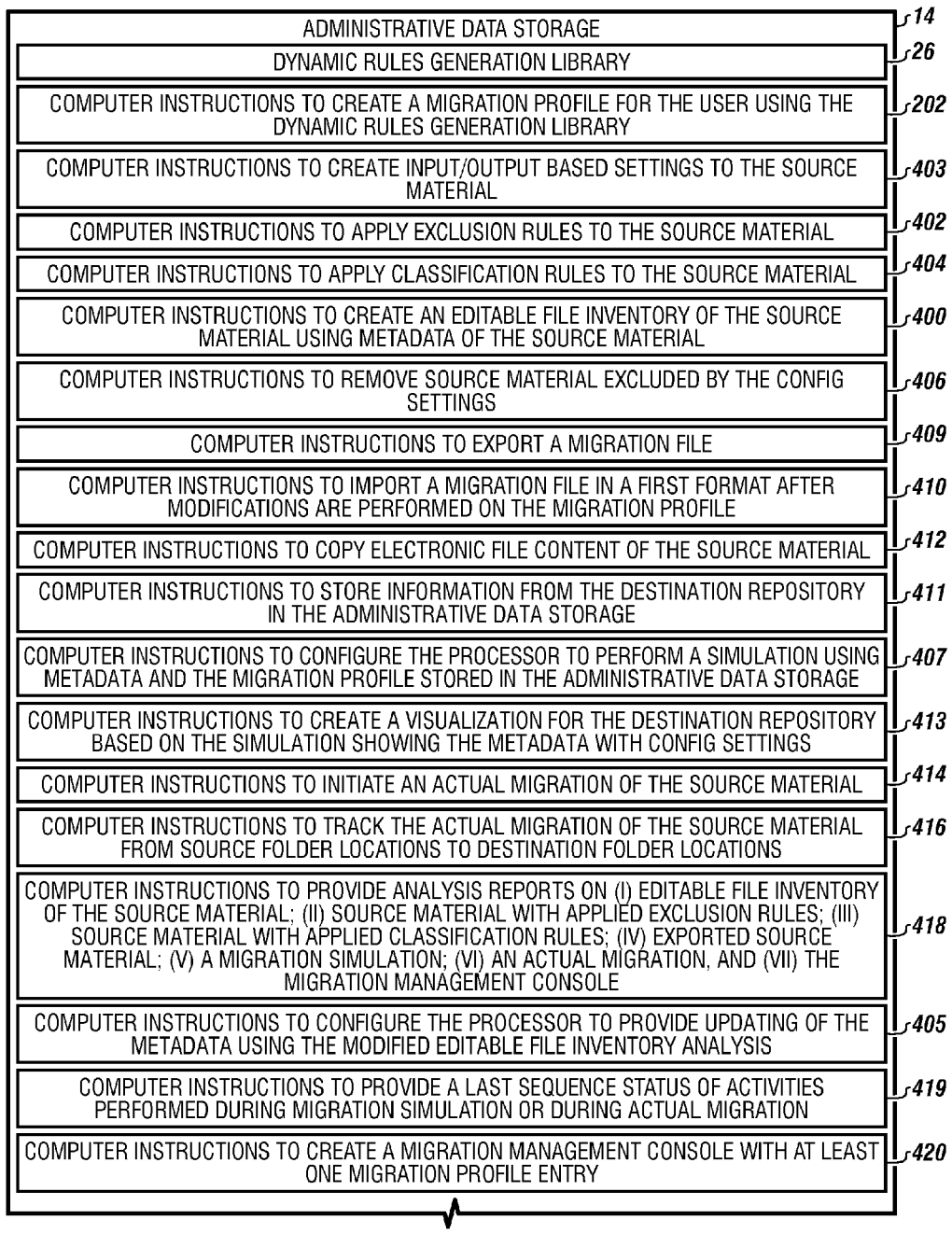

FIGURE 3B

| | |
|---|---|
| COMPUTER INSTRUCTIONS TO DELETE MIGRATION PROFILE ENTRIES IN THE MIGRATION MANAGEMENT CONSOLE | 422 |
| COMPUTER INSTRUCTIONS TO VIEW THE MIGRATION PROFILE ENTRY, EDIT THE MIGRATION PROFILE ENTRY, OR COMBINATIONS THEREOF | 424 |
| COMPUTER INSTRUCTION TO CONFIGURE THE PROCESSOR TO AUDIT ENTRIES BY COMPILING AND DISPLAYING INFORMATION RELATING TO CHANGES MADE BY THE USER TO THE MIGRATION PROFILE | 408 |
| COMPUTER INSTRUCTIONS TO CREATE A NEW MIGRATION PROFILE | 426 |
| COMPUTER INSTRUCTIONS TO VERIFY THAT THE MIGRATION OF THE FILE INVENTORY WAS COMPLETED FROM THE SOURCE REPOSITORY TO THE DESTINATION REPOSITORY WITH FEWER THAN A PRESET NUMBER OF CLIENT DESIGNATED ERRORS | 434 |
| COMPUTER INSTRUCTIONS TO REVISE THE MIGRATION PROFILE CHANGING CONFIG SETTINGS WHEN THE MIGRATION IS COMPLETED WITH ERRORS GREATER THAN THE PRESET NUMBER OF CLIENT DESIGNATED ERRORS | 435 |
| COMPUTER INSTRUCTIONS TO MIGRATE THE SOURCE MATERIAL AFTER VERIFICATION OF MIGRATION WITH FEWER THAN THE PRESET NUMBER OF CLIENT DESIGNATED ERRORS HAS OCCURRED | 436 |
| COMPUTER INSTRUCTIONS TO SAVE AND CLOSE THE ACTUAL MIGRATION, THE MIGRATION SIMULATION, OR COMBINATIONS THEREOF, AT ANY POINT OF THE MIGRATION | 438 |
| COMPUTER INSTRUCTIONS TO BROWSE THE SOURCE FOLDER PATHS | 442 |
| COMPUTER INSTRUCTIONS TO BROWSE THE DATA ENVIRONMENT ROOT PATHS | 444 |
| COMPUTER INSTRUCTIONS TO EDIT/VIEW A CLASSIFICATION LIST | 446 |
| COMPUTER INSTRUCTIONS TO SAVE AND CLOSE THE EDITABLE CLASSIFICATION RULES | 448 |
| COMPUTER INSTRUCTIONS TO PROVIDE AN EDIT AND VIEW EDITED CLASSIFICATION RULES DISPLAYING THE CLASSIFICATION VALUE TITLE AND CLASSIFICATION RULE DESCRIPTIONS OF THE MIGRATION PROFILE | 450 |
| COMPUTER INSTRUCTIONS TO CREATE EXCLUSION RULES | 452 |
| COMPUTER INSTRUCTIONS TO CREATE CLASSIFICATION RULES | 454 |
| COMPUTER INSTRUCTIONS TO EXTRACT INFORMATION FROM THE PROGRESS LOG INTO A SEPARATE FILE FORM | 456 |
| COMPUTER INSTRUCTIONS TO SAVE AND CLOSE THE MIGRATION PROFILE AT ANY POINT DURING USE | 458 |
| COMPUTER INSTRUCTIONS TO SAVE AND CLOSE THE MIGRATION MANAGEMENT CONSOLE AT ANY POINT DURING USE | 460 |
| COMPUTER INSTRUCTIONS TO DELETE AN EXCLUSION RULE ENTRY | 462 |
| COMPUTER INSTRUCTIONS TO EDIT OR ADD TO AN EXCLUSION RULE ENTRY | 464 |

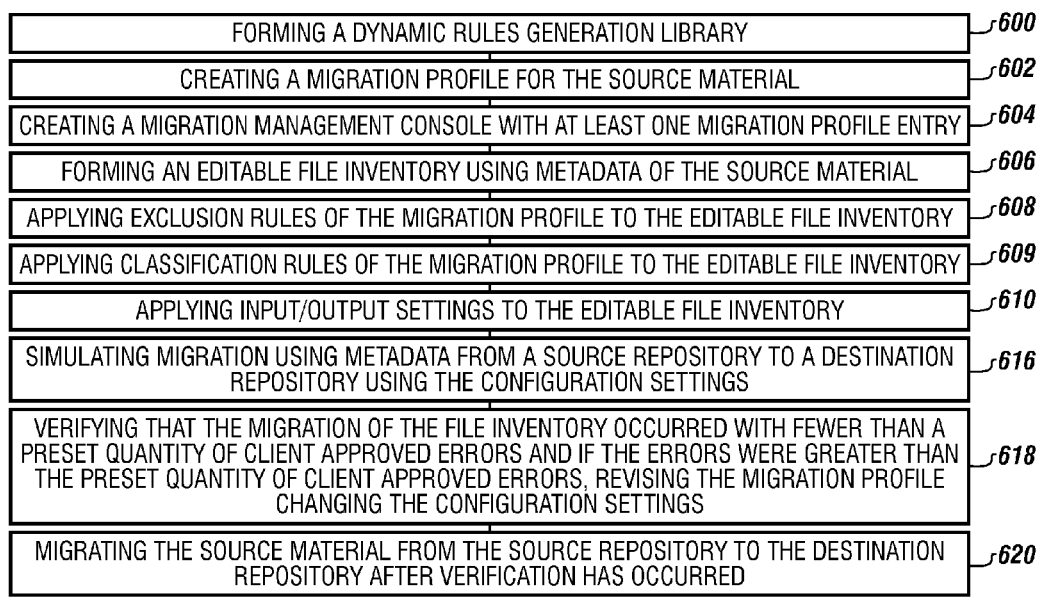

COMPUTER IMPLEMENTED METHOD FOR ACCELERATING ELECTRONIC FILE MIGRATION FROM MULTIPLE SOURCES TO MULTIPLE DESTINATIONS

CROSS REFERENCE TO RELATED APPLICATIONS

The current application claims priority to and the benefit of U.S. Provisional Patent Application Ser. No. 61/557,552 filed on Nov. 9, 2011, entitled "SYSTEM FOR ACCELLERATING ELECTRONIC FILE MIGRATION FROM MULTIPLE SOURCES TO MULTIPLE DESTINATIONS." This Reference is hereby incorporated in its entirety.

FIELD

The present embodiments generally relate to a computer implemented method for migrating source material that includes both metadata and electronic file content from an origin to a destination.

BACKGROUND

A need exists for a fast, easy to verify computer implemented method to migrate document content electronically that initially only uses metadata to create migration profiles then simulates the migration, verifies the simulation is accurate, and then finally migrates the electronic file content.

The present embodiments meet these needs.

BRIEF DESCRIPTION OF THE DRAWINGS

The detailed description will be better understood in conjunction with the accompanying drawings as follows:

FIGS. 2A-2B are a diagram of the dynamic rules generation library usable in an embodiment.

FIGS. 3A-3C are a diagram of the administrative data storage 14 usable in an embodiment.

FIG. 14 is a diagram of the steps of the method in an embodiment.

Figure 1:
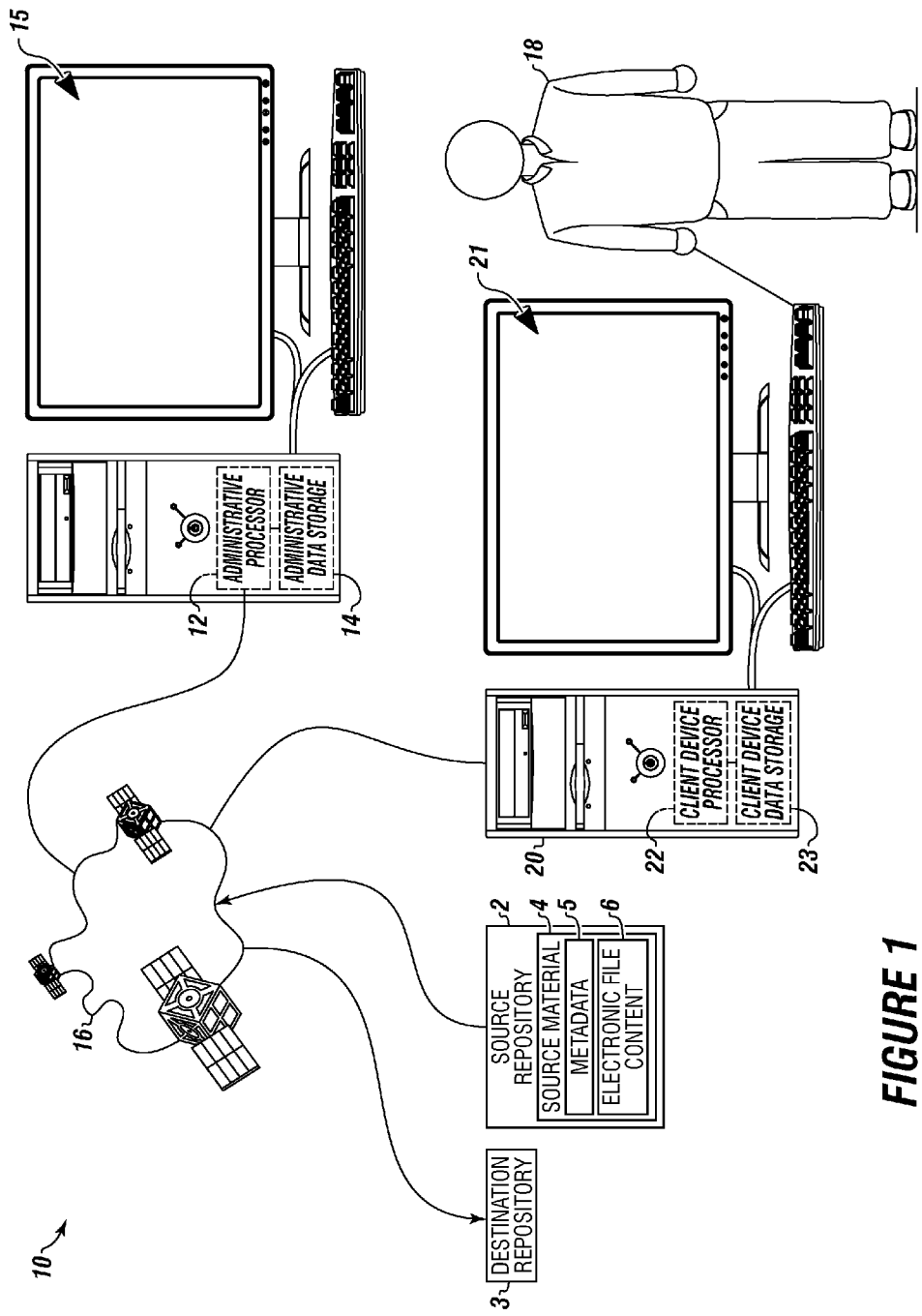
FIG. 1 is a diagram of the system usable in an embodiment.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

Embodiments of this invention generally relate to a method for file migration.

In embodiments, a user seeks to identify source material for file migration, wherein the source material has both metadata and electronic file content.

In this method, a dynamic rules generation library is used to create a migration profile to be applied to the source material.

In this method, the migration profile is used to: (i) identify source material from source folder locations using metadata, (ii) classify electronic file content using metadata, (iii) optionally delete some source material based on the metadata after classification, (iv) optionally copy electronic file content from the source material, (v) optionally run a simulation of a file migration using the copied electronic file content, and then (vi) migrate the source material to at least one of a plurality of destination folder locations.

The present method can use three fundamental analytical processes for file migration, namely (i) analysis of the file content, (ii) analysis of file organization and (iii) migration of electronic files from a plurality of source folder locations to a plurality of destination folder locations.

The method can use computer instructions that plan file migration, design file migration, develop a migration profile of files to be migrated, implement the file migration using the migration profile and a migration management console which acts as an executive dashboard, remove or maintain files not used in migration, and continue to migrate similar files as such files are created.

The method can integrate seamlessly with file share software and enterprise content management software such as Microsoft SHAREPOINT™, Open Text CONTENT SERVER™, FILENET™, and DOCUMENTUM™ software.

The method can use a processor in communication with data storage, which processor can be a computer, or a laptop, or can be a server in a computing cloud.

The processor can communicate to a display or another processor over a network, such as the Internet, a satellite network, or combinations thereof.

The processor can communicate with various client devices, each having a display allowing multiple users to simultaneously view the migration management console for tracking the file migration. The client devices and the processor can communicate via a network using at least two different gateway protocols.

The processor can communicate with a data storage that contains computer instructions. The data storage can be a cloud data storage or a plurality of connected cloud data storages in the computing cloud which can communicate with a processor in the computing cloud, a processor not in the computing cloud, or both types of processors simultaneously.

Some of the computer instructions can be installed on a client device data storage of a customer, or installed in an administrative processor which can be an administrative server.

The administrative data storage can house the computer instructions, which can include computer instructions to create a file inventory of the electronic files for migration using the metadata of the source material and can store the file inventory in the data storage.

The data storage can include computer instructions to create the aforementioned migration profile for moving the electronic file content from the source file locations, as well as computer instructions for storing the migration profile in the data storage.

The data storage can include computer instructions to form the migration management console as well as to populate the migration management console using the file inventory information and the migration profile information.

The migration management console can include computer instructions to create new migration profiles.

Each migration profile can include: (a) a migration project identifier; (b) a name of a user that sets up a migration profile; (c) a date the user set up the migration profile; (d) an additional description of the project for electronic file migration; (e) a source location for the electronic files; (f) a destination location for the electronic files; (g) a button with computer instructions allowing the deletion of a migration profile; (h) a button with computer instructions allowing profiles to be viewed and edited; (i) a link to computer instructions to perform a rule analysis on the file inventory to create an offline preview of the electronic files for migration as a verification file and transmit the verification file to a user.

The migration profile can include a profile name, a description, a progress log having a plurality of status and error messages, information related to completion of the file migration project, configuration settings, a list of input/outputs, a list of exclusions rules, and a list of classification rules.

The list of inputs and outputs can include input methods, output methods, source folder locations, destination folder locations, an add button, an edit button, a delete button; and a save and close button.

The data storage can also include computer instructions in the data storage to perform a file inventory analysis on the file inventory which is a file of metadata from the actual source material.

Computer instructions can be used to apply exclusion rules to the file inventory, to apply classification rules to the file inventory, to filter the file inventory to delete files, and to adjust input setting and output settings to form an editable preview of the file inventory in the migration management console and then store the editable preview in the data storage.

The editable preview can be viewed either in real time 24 hours a day, 7 days a week as an online preview or as an offline preview.

As an online preview, the editable preview can include an apply exclusions button, an apply classifications button, an apply filters button, an export button, and import button, and a run button.

The import button can be used to receive migration profiles or receive additional file inventory information can automatically update the file inventory forming an updated editable file preview.

In one or more embodiments, the file inventory analysis can use computer instructions that can flag documents for exclusion with an indicator.

In one or more embodiments, the method can use computer instructions which can analyze electronic files by sorting by file properties and file metadata and by filtering by file properties and file metadata.

The data storage can also include computer instructions to receive user feedback from an offline export or client device regarding the offline preview and automatically update the file inventory analysis creating an updated offline file preview.

In another embodiment, the method can use computer instructions to repeat the file inventory analysis, as well as repeat receipt of user feedback and repeat automatic updating of the offline preview until preset file migration objectives are achieved.

In still another embodiment, the method can use computer instructions that create an audit track of the user changes to the migration profile, as well as create file inventory with dates, and names.

An embodiment of the method can include computer instructions which can migrate the electronic files associated with the updated offline preview or updated online preview to user designated destinations.

In one or more embodiments, the method can include computer instructions which can use reference files to populate the file inventory with additional file metadata.

In one or more embodiments, the method can include computer instructions to delete migrated documents from source locations, and computer instructions to use XML in migration.

The method can include computer instructions which can include selecting source locations with file content for migration based on user designated criteria.

Turning now to the Figures, FIG. 1 depicts a schematic of a system according to one or more embodiments.

FIG. 1 shows the computer implemented system 10 for migrating source material 4 made of metadata 5 and electronic file content 6 from a source repository 2 to a destination repository 3.

The system can include an administrative processor 12 with administrative data storage 14 connected to a network 16 for communication with a user 18 having a client device 20 with a client device processor 22 and a client device data storage 23 connected to the network.

An administrative display 15 can connect to the administrative processor 12 which can be a laptop or another type of computer.

A client device display 21 can connect to the client device processor 22 which can be a touch screen for a cell phone, a laptop, or another computer.

Figure 2B:
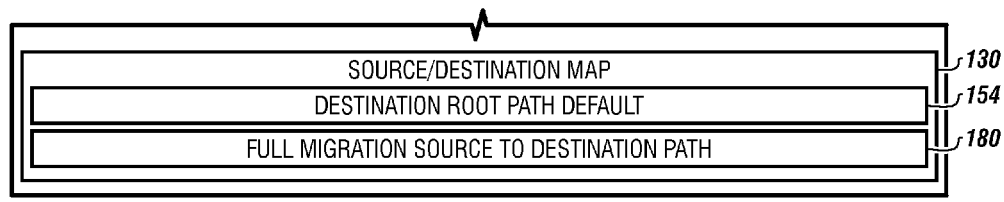

FIGS. 2A and 2B are a diagram of a portion of the dynamic rules generation library 26.

Figure 7A:
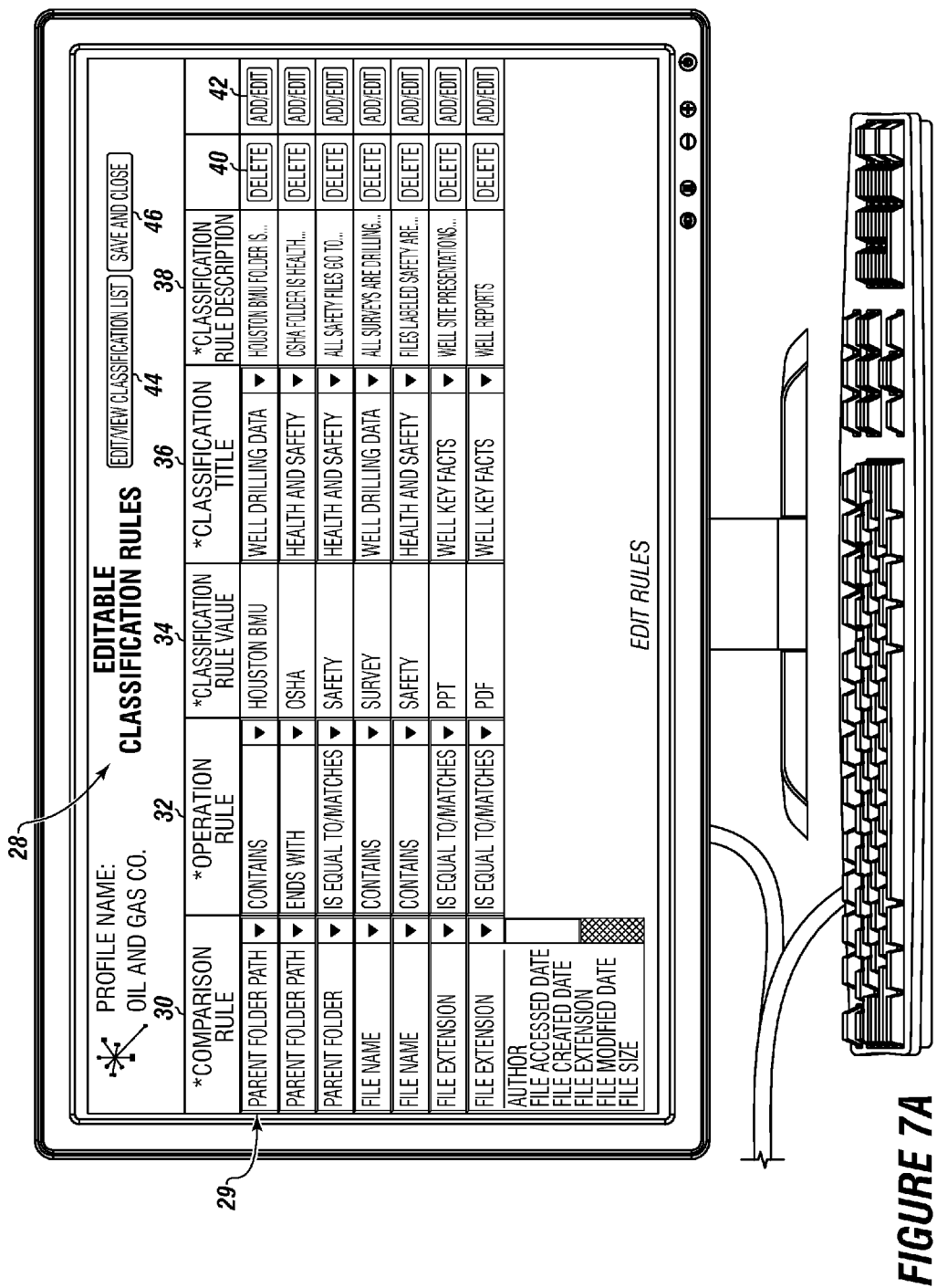
FIG. 7A is a display of an editable classification rules screen usable in an embodiment.

The dynamic rules generation library 26 can include editable classification rules 28 such as Human Resources; classification rule entries 29; classification comparison rules 30, such as File Created Date; a classification operation rules 32, such as Is Less Than; classification rule values 34 such as One Year; a classification title 36 such as Benefits; and classification rule descriptions 38 such as All Benefit Files Prior to 2012, see FIG. 7A. The editable classification rules 28 can contain the classification rule entries 29, classification comparison rules 30, classification operation rules 32, classification rule values 34, a classification title 36, classification rule descriptions 38, or combinations thereof.

Figure 6:
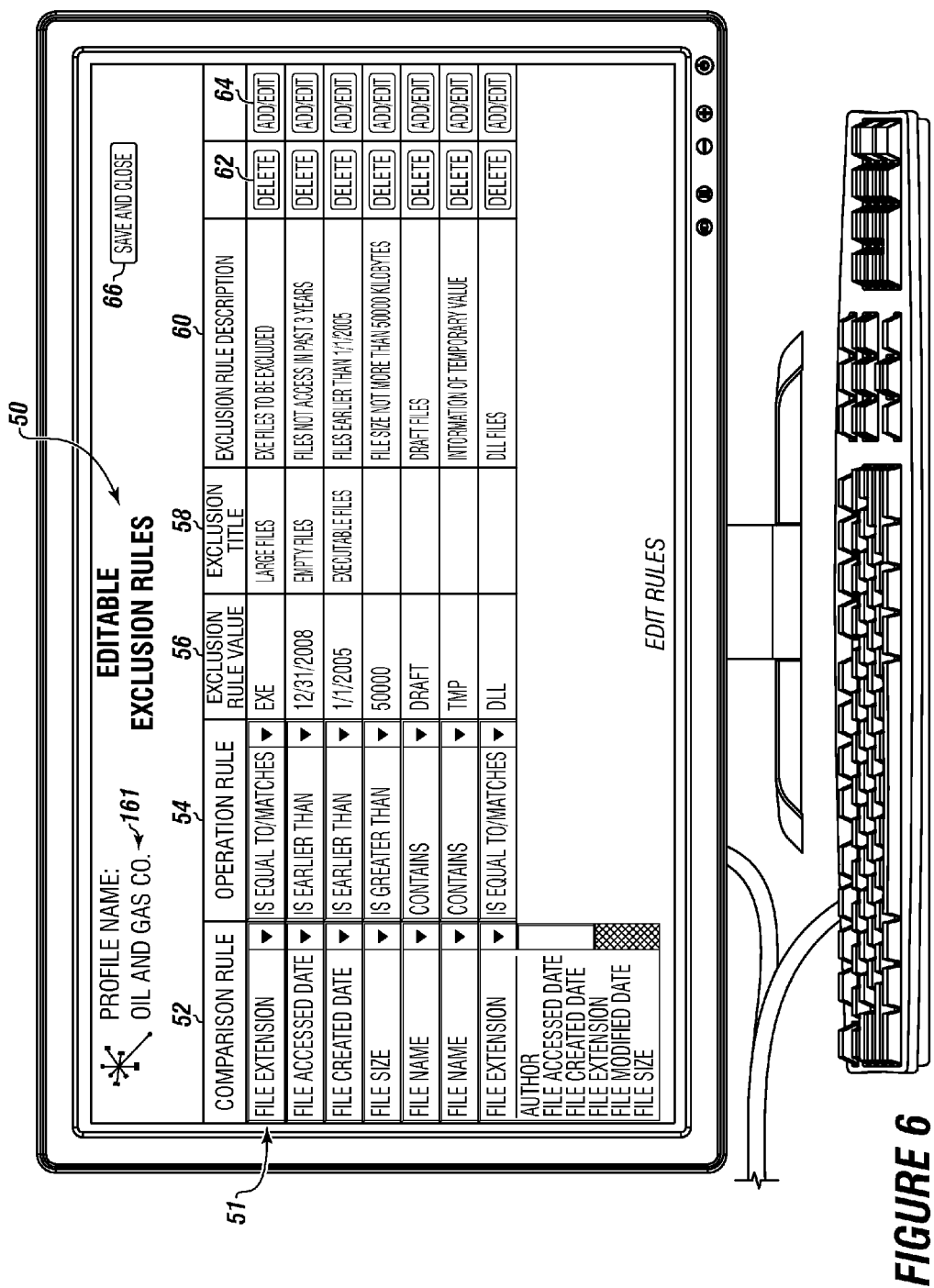
FIG. 6 is a display of an editable exclusion rules screen of an embodiment.

The dynamic rules generation library can include editable exclusion rules 50, with exclusion rule entries 51; exclusion comparison rules 52 such as File Size; exclusion operation rules 54 such as Is Greater Than; exclusion rule values 56 such as 50,000; exclusion value titles 58 such as Large Files; and exclusion rule descriptions 60 such as Files Larger than 50,000 bytes, see FIG. 6.

Figure 10:
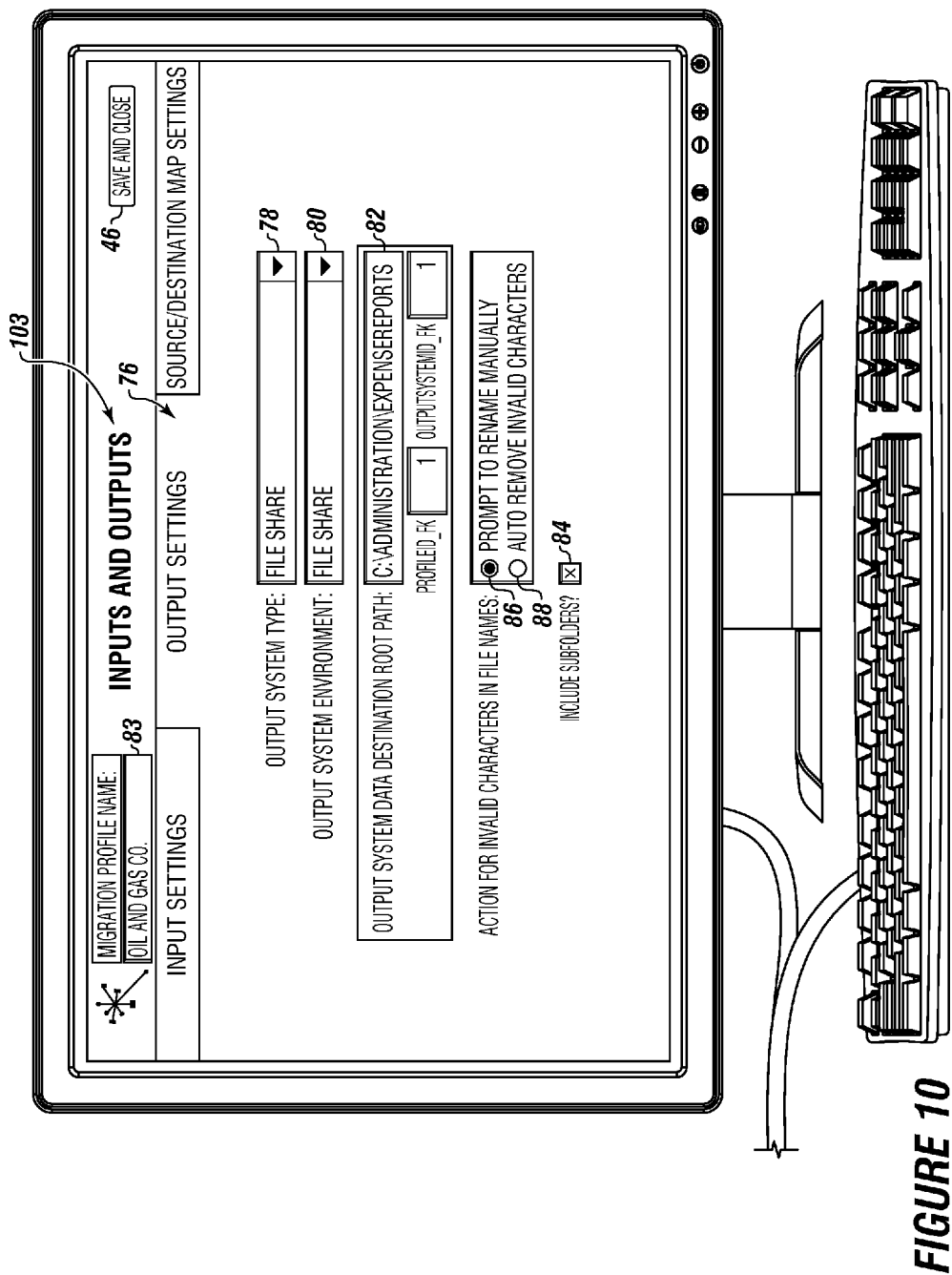
FIG. 10 is a display of an inputs and outputs screen showing output settings information.

The dynamic rules generation library 26 can include output settings 76, with an output system type 78 such as Content Server, an include output subfolders indicator 84 such as a Checkbox, an indicator prompt to rename manually 86 which renames the files such as a Radio Button, an indicator to auto-remove invalid characters 88 from filenames such as a Radio Button, see FIG. 10.

The dynamic rules generation library 26 can include in the output settings 76, an output system environment 80 such as SharePoint, and an output system data destination root path 82 such as c:\humanresources\houston\employeefiles, see FIG. 10.

Figure 9:
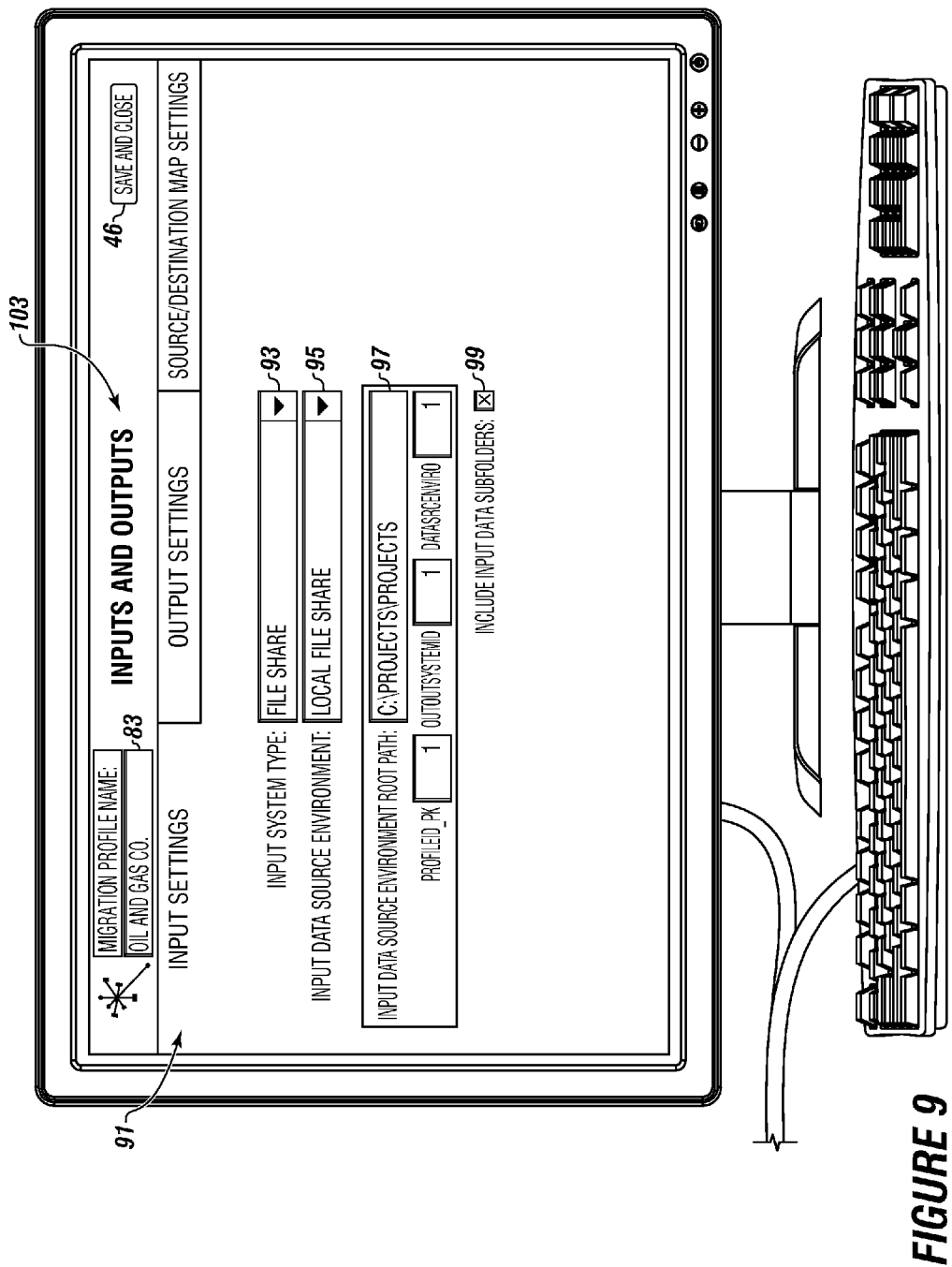
FIG. 9 is a display of an inputs and outputs screen showing input settings information.

The dynamic rules generation library 26 can include input settings 91 with an input system type 93 such as Alchemy, an input data source environment 95 such as Networked File Share; an input data source environment root path 97 such as c:\\administration\weekly meetings, and an include input data subfolders indicator 99 which can be a Checkbox, see FIG. 9.

Figure 13:
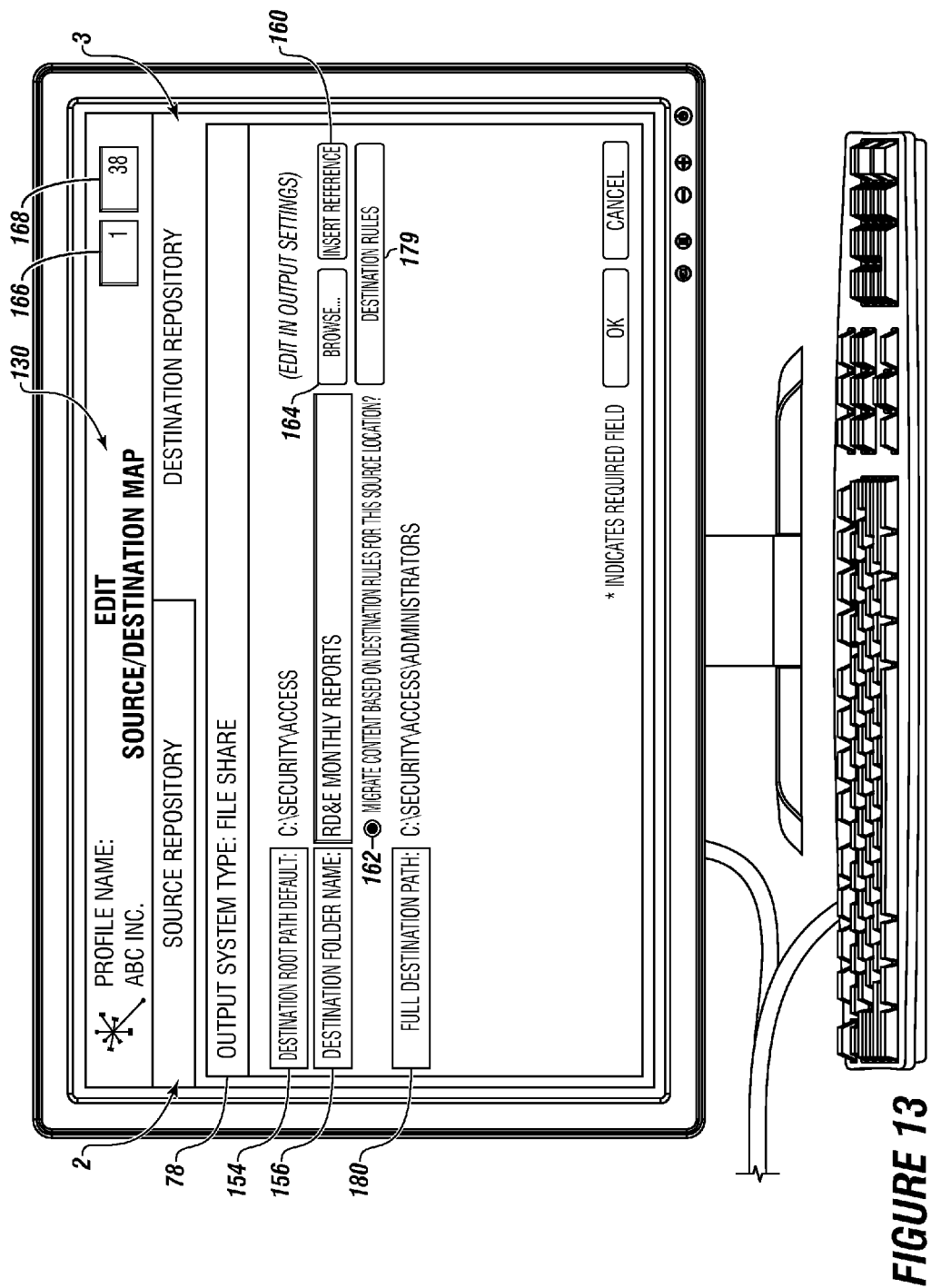
FIG. 13 is a display of an edit source/destination map showing destination repository information.

The dynamic rules generation library 26 can include a source/destination map 130 with a destination root path default 154 such as c:\healthandsafety\ and a full migration source to destination path 180, such as c:\healthandsafety\material data sheets\2012\, see FIG. 13.

FIG. 3A is a diagram of an administrative data storage 14 usable in an embodiment.

The administrative data storage 14 can contain the dynamic rules generation library 26 depicted in FIGS. 2A and 2B

To understand the computer instructions which reside in the administrative data storage, the computer instructions should be viewed together with the various display screens that follow as FIGS. 4-13.

The invention is an accelerated electronic file migration system for migrating source material that includes metadata and electronic file content from a source repository to a destination repository.

Figure 3C:
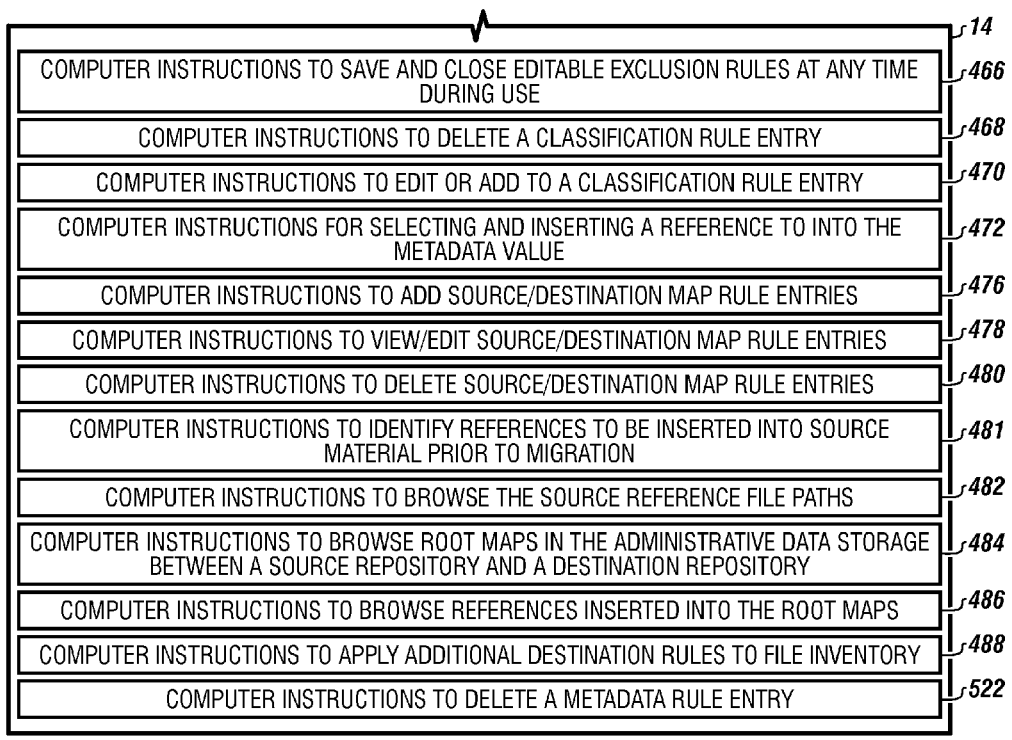

The system includes the components described in FIG. 1 and uses the dynamic rules generation library of FIGS. 2A and 2B to perform a sequence of steps using the computer instructions detailed in FIGS. 3A, 3B, and 3C.

First, the system can use the computer instructions to create a migration profile for electronic file content to be moved from the source repository to the destination repository.

At minimum, the migration profile can include a profile name and config settings that create settings for classification rules and exclusion rules, as well as input and output settings and a plurality of profile entries for the migration profile.

Additionally, the migration profile can be used to create inventory files using metadata of the source material.

The system can then use computer instructions to apply various config settings to the source material.

The system can use computer instructions to activate a simulation of the migration by copying metadata of the source material; and creating a visualization for the destination repository showing the metadata using the config settings which include input/output settings, classification rules and exclusion rules.

In addition to the ability to run a simulation using the metadata of the source material, the system can also initiate an actual migration of the electronic file content of the source material.

The system can use a progress log formed from computer instructions in the administrative data storage that provides a last sequence status of activities performed during migration simulation or during actual migration.

Finally the system can have a migration management console that can act as an executive dashboard, showing twenty-four hours a day, and seven days a week at least one migration profile and the status of elements of the migration, the simulation, or combinations thereof.

The accelerated system for document migration can have other features.

Returning now to FIGS. 3A, 3B and 3C, the administrative data storage can include computer instructions 202 to create a migration profile for the user using the dynamic rules generation library.

Many of the computer instructions in the administrative data storage connect to certain buttons or fields on the display screens of FIGS. 4-13, however, some of the computer instructions do not specifically tie to buttons. The following are the computer instructions that do not tie to specific buttons shown in FIGS. 4-13, but are used in the migration. The remaining computer instructions are grouped with regard to a Figure that displays the associated button for clarity of connection between the computer instructions and specific buttons shown in the Figures.

The administrative data storage 14 can include computer instructions 434 to verify that the simulated migration of the file inventory was completed from the source repository to the destination repository with fewer than a preset number of client allowable errors.

The verification can be viewed on the migration profile in the progress log.

An example of a preset number of client allowable errors is 15 percent.

An example of the verification that the migration of the file inventory is complete with fewer than the preset number of client approved errors would be seen in the progress log.

The administrative data storage 14 can include computer instructions 435 to revise the migration profile, changing config settings when the migration is completed with errors greater than the preset number of client allowable errors.

The revision of the migration can be viewed on the migration profile in the audit log, the changing of config settings when the migration is completed with errors greater than the preset number of client allowable errors can be viewed on the migration profile in the audit log.

The administrative data storage 14 can include computer instructions 436 to migrate the source material after simulation with fewer than the preset number of client allowable errors has occurred.

Figure 4:
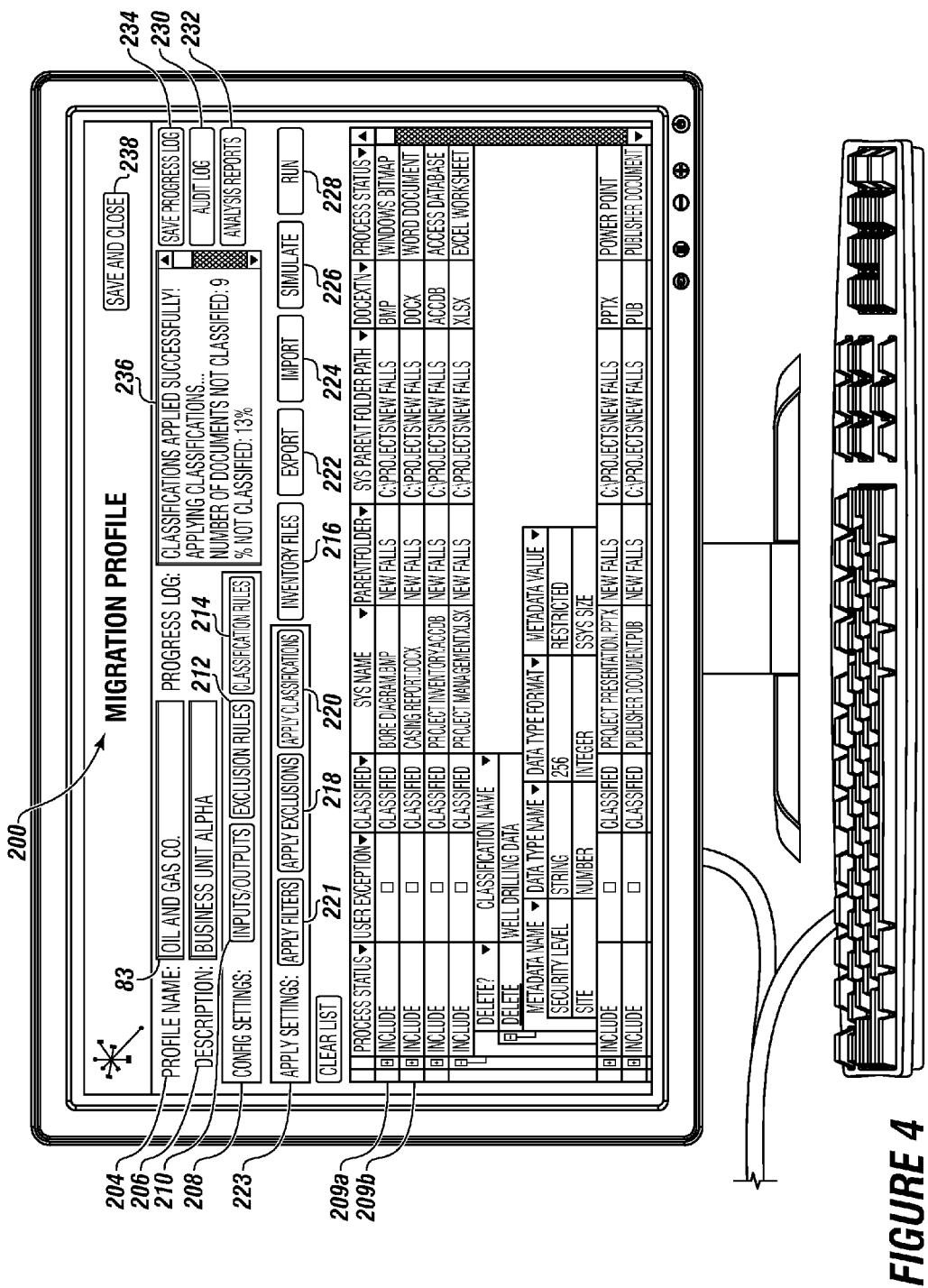
FIG. 4 is a display of a migration profile usable in an embodiment.

These computer instructions 436 can be activated by using the run button 228 on the migration profile shown in FIG. 4.

Computer Instructions Related to FIG. 4

FIG. 4 shows a display of the migration profile 200 according to an embodiment with a plurality of file inventory entries 209a and 209b. FIG. 4 can be best understood with reference to the computer instructions stored in the administrative data storage depicted in FIGS. 3A, 3B, and 3C, as well as the dynamic rules generation library depicted in FIGS. 2A and 2B.

The administrative data storage can contain computer instructions 400 to create an editable file inventory of the source material using metadata of the source material.

The computer instructions 400 can be linked to an inventory files button 216 shown in FIG. 4 on the migration profile 200.

The editable file inventory can be formed by taking metadata from source material.

The administrative data storage 14 can include computer instructions 402 to apply exclusion rules to the source material.

Exclusion rules can be applied and files can be removed from the inventory according to the exclusion rules.

The computer instructions 402 can be linked to an apply exclusion rules button 218 shown in FIG. 4.

The administrative data storage can include computer instructions 403 to create input/output based settings for the source material. The computer instructions 403 are linked to a create input/output button 210 shown in FIG. 4.

The input/output settings can be created by selecting the input system type 93, the input data source environment 95, the input data source environment root path 97, the output system type 78, the output system environment 80, and the output system data destination root path 82.

The administrative data storage can include computer instructions 404 to apply classification rules to the source material; and combinations thereof. The computer instructions 404 can be linked to the apply classification rules button 220 shown in FIG. 4.

The classification rules are applied by adding or updating metadata associated with the source content as defined by the selected classification rules.

The administrative data storage can include computer instructions 406 to remove source material excluded by the config settings. The computer instructions 406 can be connected to the apply filter button 221 shown in FIG. 4.

The source material selected for removal can be identified by the exclusion rules.

The administrative data storage can include computer instructions 409 to export a file inventory. The computer instructions 409 can be linked to the export button 222 shown in FIG. 4.

The export of the file inventory can be achieved by saving the file inventory to a separately named file using a specified root path.

The administrative data storage can include computer instructions 410 to import a file inventory in a first format after modifications are performed on the file inventory. The computer instructions 410 can be linked to the import button 224 shown in FIG. 4.

The import of the file inventory can be performed by importing the metadata 5 of the source material 4 from the file inventory in a first format after modifications are performed on the file inventory, and combinations thereof.

The administrative data storage can include computer instructions 412 to copy metadata of the source material.

The copying of the metadata 5 can be achieved by copying metadata 5 remaining after applying the config settings 208 to the source material.

The administrative data storage can include computer instructions 411 to store information from the destination repository in the administrative data storage.

The administrative data storage can include computer instructions 407 to configure the processor to perform a simulation using metadata of the migration profile stored in the administrative data storage.

The administrative data storage can include computer instructions 413 to create a visualization for the destination repository based on the simulation showing the metadata with config settings.

The creation of the visualization for the destination repository can look like a hierarchically organized, sorted or prioritized collection of source material 4, or combinations thereof.

Both of the computer instructions 412 and 413 can be linked to the simulate button 226 shown in FIG. 4.

The administrative data storage 14 can include computer instructions 414 to initiate an actual migration of the source material. The computer instructions 414 can be linked to the run button 228 shown in FIG. 4.

To cause the actual migration of the source material 4 from the source repository 2 to the destination repository 3 using the config settings of the migration profile, the run button 228 is activated.

The administrative data storage can have computer instructions 416 to create a log of the user's interactions with the migration profile.

The computer instructions 416 can be linked to the audit log button 230 shown in FIG. 4.

An example of the user's interactions includes creation of an exclusion rule.

The administrative data storage can include computer instructions 418 to provide analysis reports on (i) an editable file inventory of the source material, (ii) source material with applied exclusion rules; (iii) source material with applied classification rules; (iv) exported source material; (v) a migration simulation; (vi) an actual migration, and (vii) the migration management console. The computer instructions 418 can be linked to the analysis report button 232 shown in FIG. 4.

For example, source material with applied exclusion rules can be human resources source materials from 2012 excluding benefits source material.

For example, source material with applied classification rules can be well drilling data files with Houston in the file name.

For example, exported source material can be administrative reports from 2012 for the Seattle location.

For example, a migration simulation could be a migration of metadata 5 for an offshore rig located in the Gulf of Mexico from a local file share to a discovery repository.

For example, an actual migration could be migrating metadata 5 and electronic file content 6 for an offshore rig located in the Gulf of Mexico from a local file share to a discovery repository.

The administrative data storage can include computer instructions 405 to configure the processor to provide updating of the metadata using the modified editable file inventory analysis.

The administrative data storage can include computer instructions 419 to provide a last sequence status of activities performed during migration simulation or performed during actual migration. The computer instructions 419 can be linked to the progress log 236 shown in FIG. 4.

An example of providing the last sequence status of activities performed during migration simulation is 55 percent of files successfully classified.

An example of providing the last sequence status of activities performed during actual migration is 82 percent of files successfully classified.

Returning again to FIG. 4 and the Migration Profile 200, the following computer instructions can be used with that profile.

The administrative data storage can include computer instructions 452 to create exclusion rules.

The term "create exclusion rules" as used herein means to identify the source material that should not be included in the migration based on user selected parameters.

The computer instructions 452 can be linked to the create exclusion rule button 212 shown in FIG. 4.

The administrative data storage can include computer instructions 454 to create classification rules.

The phrase "create classification rules" as used herein means to apply metadata to the source material that should be included in the migration based on user selected parameters The computer instructions 454 can be linked to the create classification rule button 214 shown in FIG. 4.

The administrative data storage can include computer instructions 456 to extract information from the progress log into a separate file form.

The term "extract information from the progress log into a separate file form" as used herein means to save the contents of the progress log into a readable file such that a user can understand the status.

The computer instructions 456 can be linked to the migration profile save progress log button 234 shown in FIG. 4.

The administrative data storage can include computer instructions 458 to save and close the migration profile at any point during use.

The computer instructions 458 can be linked to the migration profile save and close button 238 shown in FIG. 4.

Figure 5:
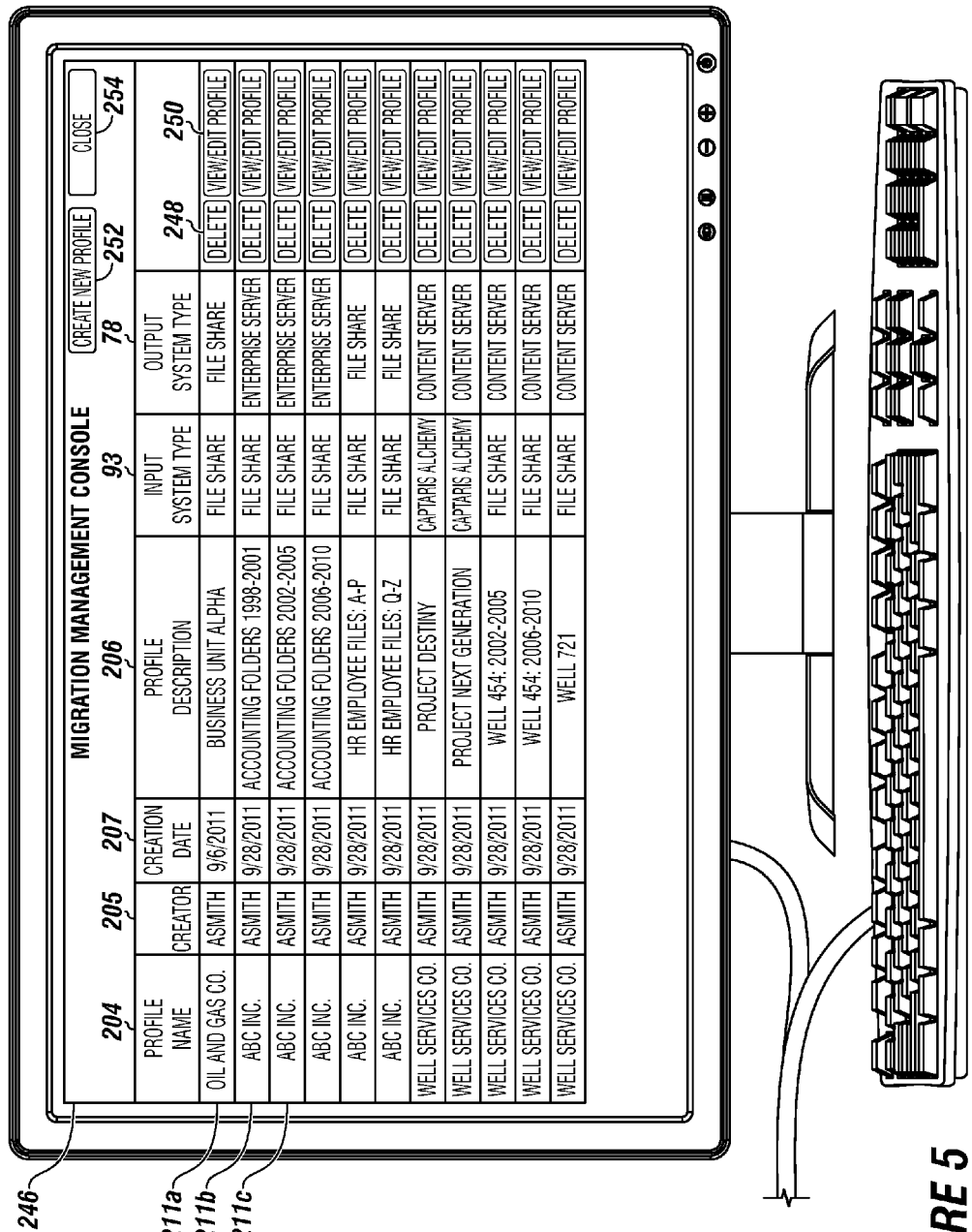
FIG. 5 is a display of a migration management console usable in an embodiment.

Computer Instructions Related to FIG. 5

FIG. 5 can be best understood with reference to the computer instructions stored in the Administrative Data Storage depicted in FIGS. 3A, 3B, and 3C, as well as the Dynamic Rules Generation Library depicted in FIGS. 2A and 2B.

The administrative data storage can include computer instructions 420 to create a migration management console 246 with at least one migration profile entry 211 as shown in FIG. 5.

FIG. 5 depicts a display of a migration management console with a plurality of migration profile entries 211a, 211b and 211c, according to one or more embodiments.

The administrative data storage can include computer instructions 422 to delete migration profile entries 211a, 211b, and 211c in the migration management console 246. The computer instructions 422 can be linked to a migration console delete button 248 shown in FIG. 5.

The migration console delete button can be used to delete a migration profile entry 211.

The administrative data storage can include computer instructions 424 to view one of the migration profile entries 211, edit one of the migration profile entries 211, or combinations thereof. The computer instructions 424 can be linked to the migration management console view/edit profile button 250 shown in FIG. 5.

The view/edit profile button 250 allows the user to see a display of and modify a migration profile 200.

The administrative data storage can include computer instructions 408 to configure the processor to audit entries by compiling and displaying information relating to changes made by the user to the migration profile.

The administrative data storage can include computer instructions 426 to create a new migration profile. The computer instructions 426 can be linked to a create new profile button 252 shown in FIG. 5.

The "create new profile" button 252 can allow the user to generate a migration profile 200 specifying a name and config settings.

The administrative data storage can include computer instructions 460 to save and close the migration management console at any point during use. The computer instructions 460 can be linked to the migration management console close button 254 shown in FIG. 5.

Computer Instructions Related to FIG. 6

The administrative data storage can include computer instructions related to the display shown in FIG. 6 titled "editable exclusion rules" 50.

The administrative data storage can include computer instructions 462 to delete an exclusion rule entry.

The phrase "delete an exclusion rule entry" as used herein means to delete an entry from the list of exclusion rule entries 51 for the migration profile 200.

The computer instructions 462 can be linked to the exclusion rule delete button 62 shown in FIG. 6.

The administrative data storage can include computer instructions 464 to edit or add to an exclusion rule entry 51 presented in FIG. 6. The computer instructions 464 can be linked to the exclusion rule edit/add button 64 shown in FIG. 6.

The phrase "edit or add to an exclusion rule entry" as used herein means to add a new entry or to edit an existing entry of exclusion rule entries 51 for the migration profile 200.

The administrative data storage can include computer instructions 466 to save and close editable exclusion rules at any time during use. The computer instructions 466 can be linked to the exclusion rule save and close button 66 shown in FIG. 6.

The administrative data storage can include computer instructions 468 to delete a classification rule entry.

The phrase "delete a classification rule entry" as used herein means to delete an entry from the list of classification rule entries 29 for the migration profile 200.

Computer Instructions Related to FIG. 7a

The administrative data storage can include computer instructions 438 to save and close the actual migration, the migration simulation, or combinations thereof, at any point of the migration.

These computer instructions 438 can be connected to the classification save and close button 46 shown in FIGS. 7A, 7B, 9, 10, and 11.

The computer instructions can present an editable classification rules display 28 shown in FIG. 7A. The following computer instructions relate to that display.

The administrative data storage can include computer instructions 446 to edit/view a classification list, which means to edit or view one of the classification comparison rules 30, the classification operation rules 32, the classification rule values 34, the classification title 36, the classification rule descriptions 38, and combinations thereof as shown in FIG. 7A.

Computer instructions 468 can connect to the delete button 40 shown in FIG. 7A allowing individual entries 29 to be deleted from the editable classification rules.

The term "classification comparison rules" means the metadata 5 to be compared in the classification rule entry 29.

The term "classification operation rules" is defined to be the comparison operation to be used in a given classification rule entry 29.

The term "classification rule values" as used herein means the value that the metadata 5 will be compared against in a given classification rule entry 29.

The term "classification title" as the phrase is used herein refers to the name of the selected classification to be assigned to a given classification list entry when a given comparison rule 30 combined with a given operation rule 32 and combined with a classification rule value 34 is true.

The term "classification rule descriptions" is defined as the description assigned to a given classification rule entry 29.

The computer instructions 446 can be linked to the edit/view classification list button 44 shown in FIG. 7A which is a display of the editable classification rules.

The administrative data storage can include computer instructions 448 to save and close the editable classification rules. The computer instructions 448 can be linked to the save and close button 46 shown in FIG. 7A. The same button can close and save several of the displays and these computer instructions include the computer instructions for each display as mentioned above.

The administrative data storage can include computer instructions 450 to provide an edit and view edited classification rules 28 of FIG. 7A, displaying the classification title 36 and classification rule description 38 of the migration profile.

The computer instructions 468 can be linked to the classification rule delete button 40 shown in FIG. 7A.

The administrative data storage can include computer instructions 470 to edit or add to a classification rule entry.

The phrase "edit or add to a classification rule entry" as used herein means a user can modify a classification rule entry 29.

The computer instructions 470 can be linked to the classification rule edit/add button 42 shown in FIG. 7A.

Figure 7B:
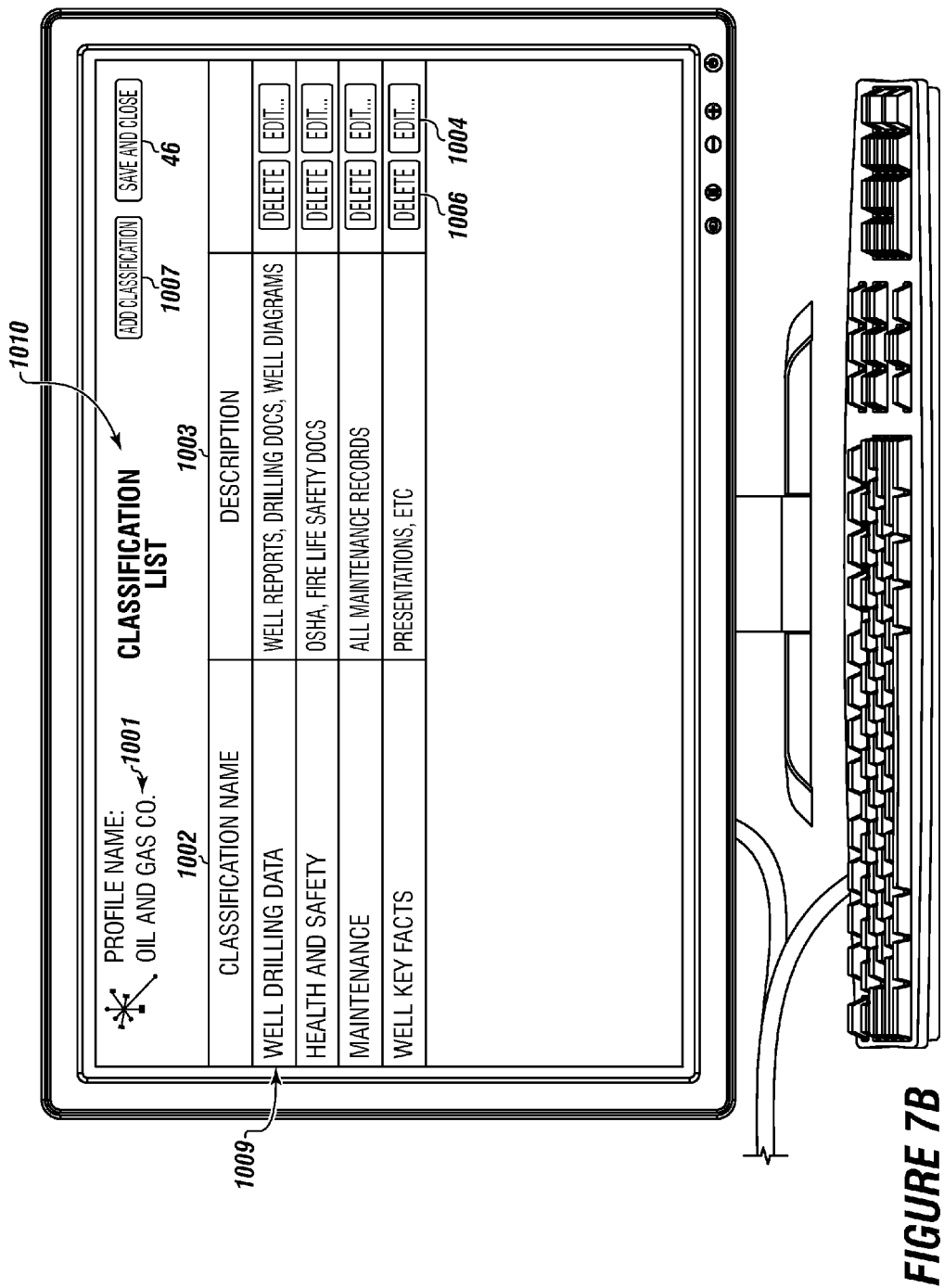
FIG. 7B is a display of a classification list.

Computer Instructions Related to FIG. 7b

The administrative data storage can include computer instructions 524 to delete an entry from the classification list related to button 1006 of FIG. 7B.

The administrative data storage can include computer instructions 526 to add a classification list item linked to button 1007 of FIG. 7B.

The administrative data storage can include computer instructions 528 to save and close the classification list.

Figure 8:
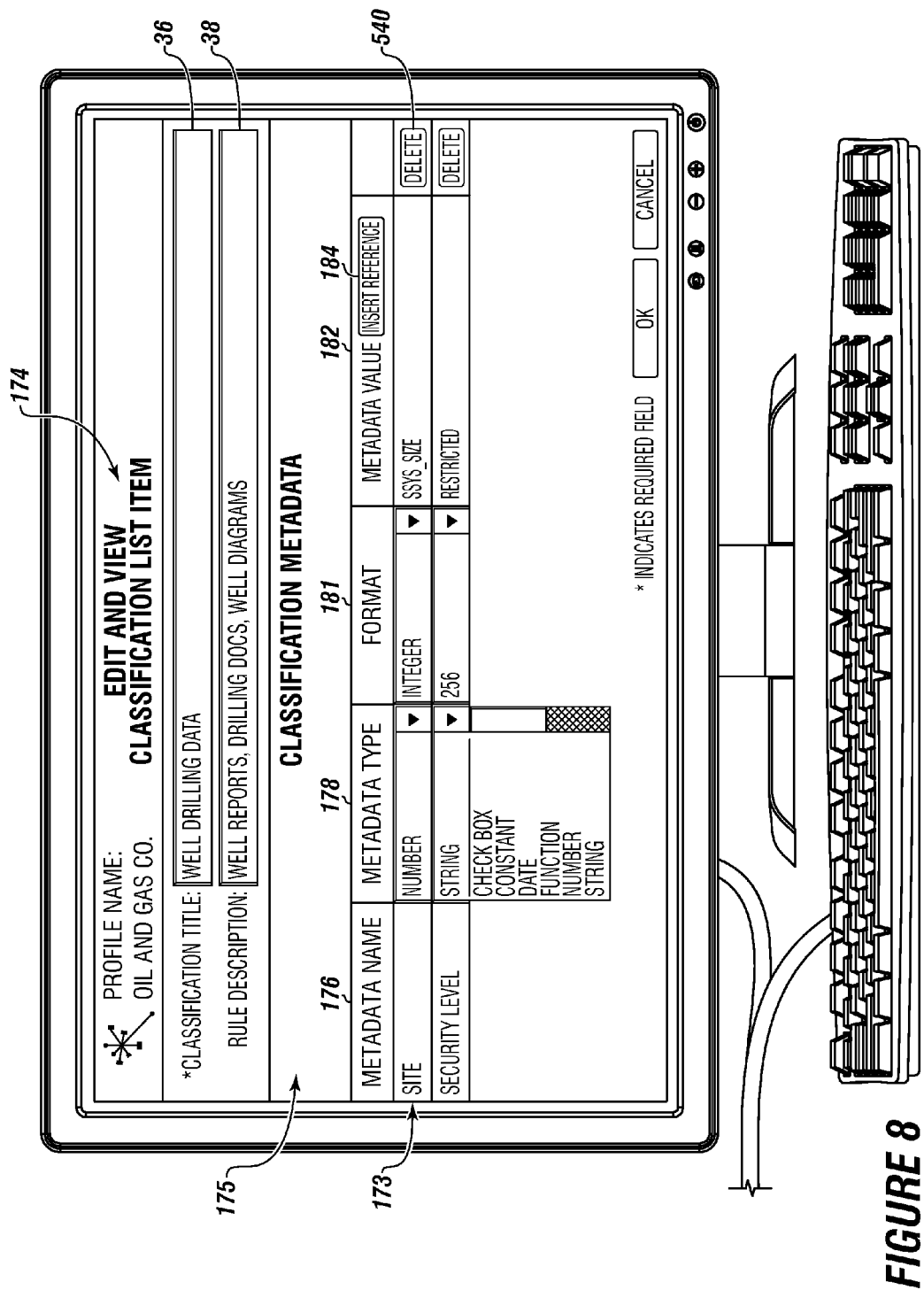
FIG. 8 is an edit and view classification list item display in an embodiment.

Computer Instructions Related to FIG. 8

The administrative data storage can include computer instructions 522 to delete a metadata rule entry 173. The computer instructions 522 can be linked to the classification metadata delete button 540.

The administrative data storage can include computer instructions 472 for selecting and inserting a reference into the metadata value.

The phrase "selecting and inserting a reference to into the metadata value" means to place a file attribute into the metadata value for the metadata rule entry 173.

The computer instructions 472 can be linked to the insert reference button 184 shown in FIG. 8.

Figure 11:
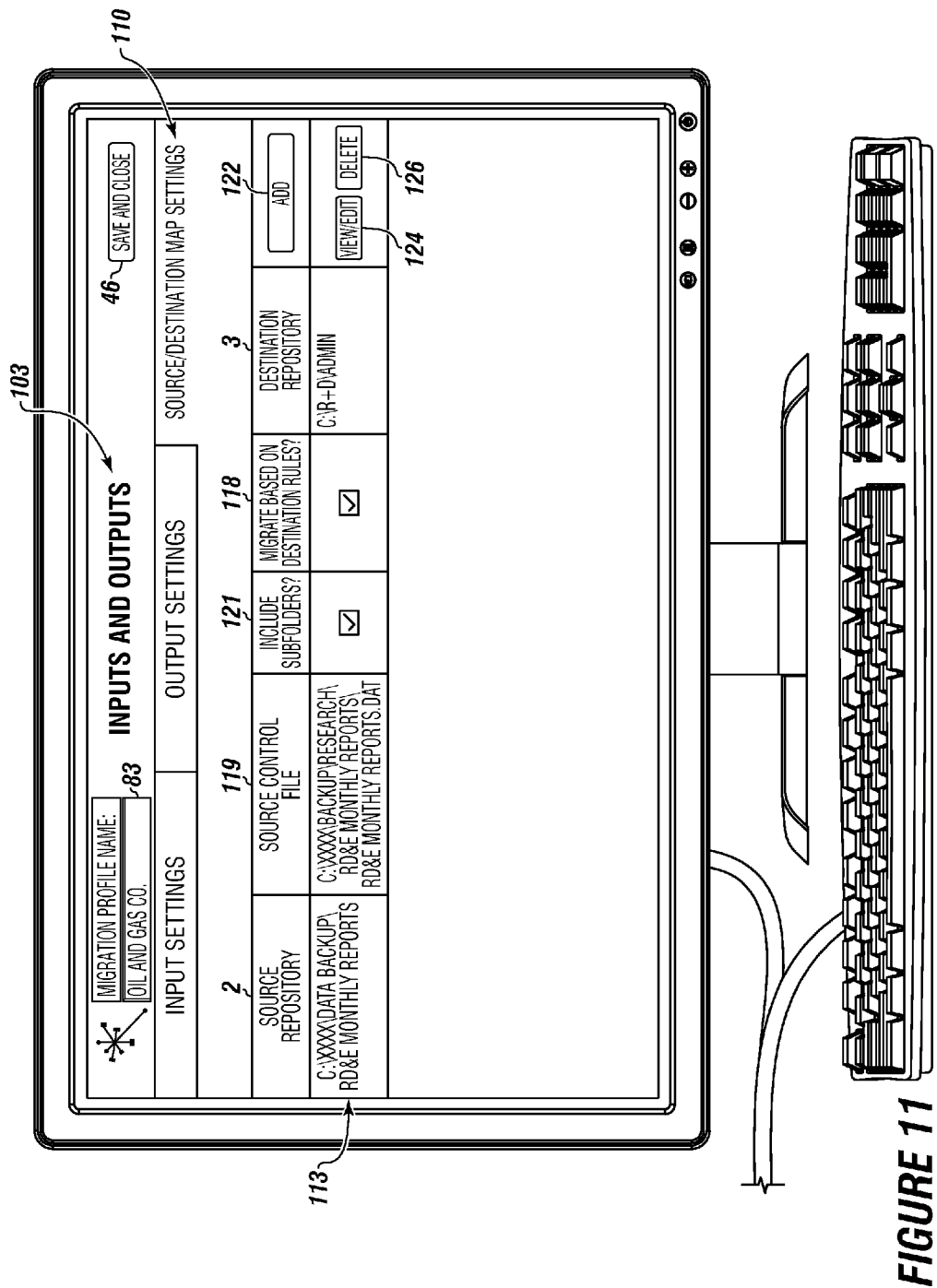
FIG. 11 is a display of an inputs and outputs screen showing source/destination map settings information.

Computer Instructions Related to FIG. 11

The administrative data storage can include computer instructions 476 to add source/destination map rule entries 113. The computer instructions 476 can be linked to the map add button 122 shown in FIG. 11.

The administrative data storage can include computer instructions 478 to view/edit source/destination map rule entries 113. The computer instructions 478 can be linked to the map view/edit button 124 shown in FIG. 11.

The administrative data storage can include computer instructions 480 to delete source/destination map rule entries 113. The computer instructions 480 can be linked to the map delete button 126 shown in FIG. 11.

Figure 12:
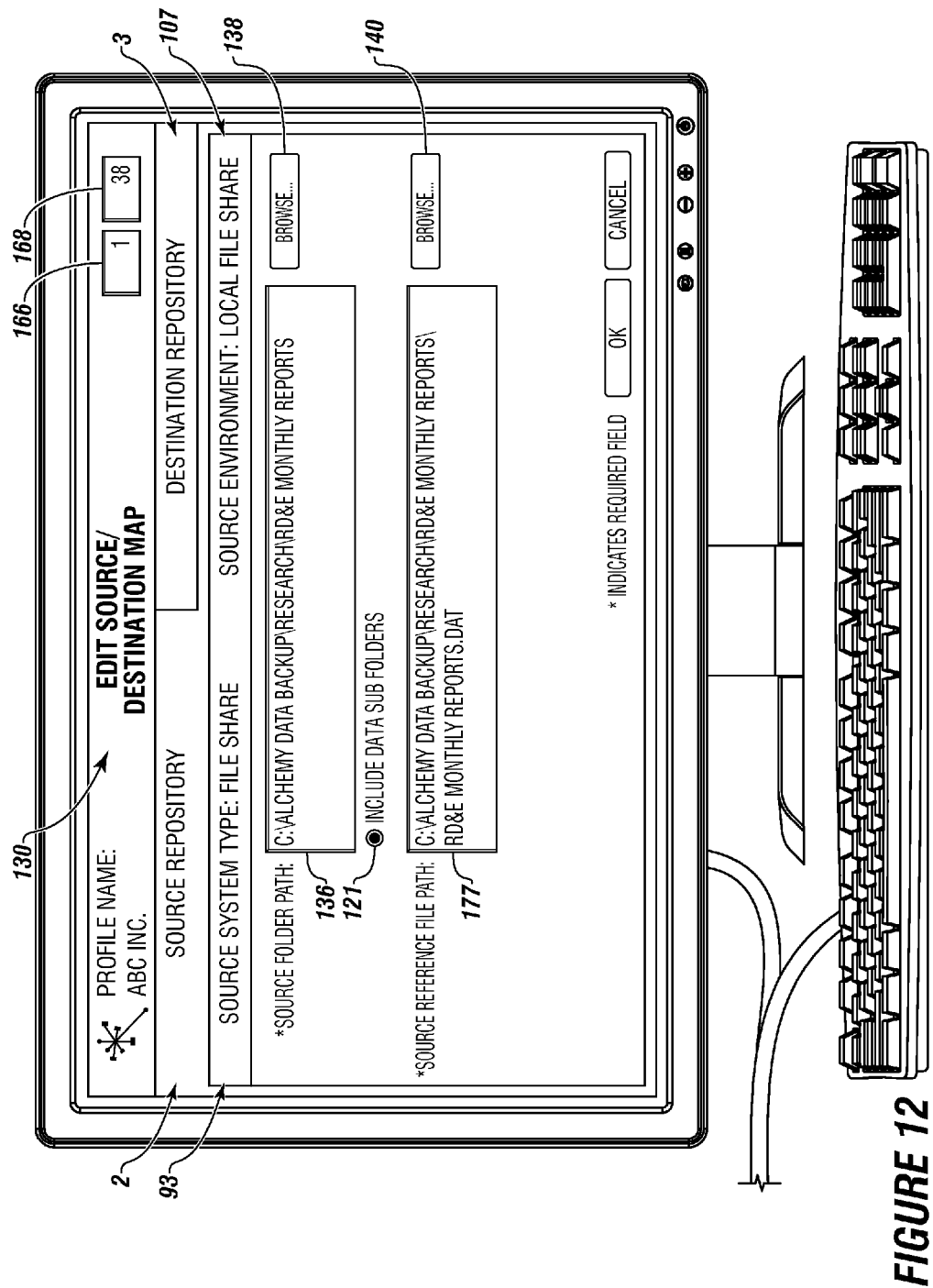
FIG. 12 is a display of an edit source/destination map showing source repository information.

Computer Instructions Related to FIG. 12

The computer instructions in the administrative data storage can also relate to other displays. The following computer instructions relate to the display of FIG. 12.

The administrative data storage can include computer instructions 442 to browse the source folder paths.

The term "source folder path" as used herein means the hierarchical folder location where the source material 4 resides.

The computer instructions 442 can be linked to the source folder path browse button 138 shown in FIG. 12.

The administrative data storage can include computer instructions 482 to browse the source reference file paths.

The term "source reference file path" as the term is used herein means The hierarchical folder location where the source material resides.

The computer instructions 482 can be linked to the source reference file path browse button 140 shown in FIG. 12.

The administrative data storage can include computer instructions 481 to identify references to be inserted into source material 4 prior to migration. The computer instructions 481 can be linked to display the source reference file path 177 shown in FIG. 12.

Computer Instructions Related to FIG. 13

The administrative data storage can include computer instructions 484 to browse root maps in the administrative data storage between a source repository and a destination repository. The computer instructions 484 can be linked to the source destination root map browse button 164 shown in FIG. 13.

The administrative data storage can include computer instructions 486 to browse references inserted into the root maps. The computer instructions 486 can be linked to the source destination insert reference button 160 shown in FIG. 13.

The administrative data storage can include computer instructions 488 to apply additional destination rules to file inventory. The computer instructions 488 can be linked to the destination rules button 179 shown in FIG. 13.

The administrative data storage can include computer instructions 536 to provide a "this folder indicator"166 and a "total folders indicator" 168 as shown in FIG. 13.

Now that the details of FIGS. 3A, 3B, and 3C are understood, it is possible to return to the elements of FIGS. 4-13 in more detail.

FIG. 4 is a display of a migration profile usable in an embodiment of the invention.

As shown in FIG. 4, the migration profile 200 can be comprised of a profile name 83, a profile name 204, a description 206, config settings 208, a form inventory files button 216, an export button 222, an apply settings component 223, an import button 224, a simulate button 226, a run button 228, an audit log button 230, an analysis reports button 232, a save progress log 234, a progress log 236, and a save and close button 238.

The apply settings component 223 can contain an apply exclusion rules button 218, an apply classification rules button 220, and an apply filters button 221.

The config settings 208 can comprise a create input/output settings button 210, a create exclusion rule button 212, and a create classification rule button 214.

FIG. 5 is a display of a migration management console that manages at least one and up to 10,000 migration profiles, each having a profile name 204.

As shown in FIG. 5, the migration management console 246 can contain a save and close button 254, an output system type 78, an input system type 93, a profile name 204, a migration profile creator 205, a migration profile description 206, a migration profile creation date 207, migration profile entries 211, a migration console delete button 248, a migration console view/edit profile button 250, and a create new profile button 252.

FIG. 6 is a display of editable exclusion rules usable in an embodiment.

As shown in the FIG. 6, the display of editable exclusion rules 50 can include an exclusion comparison rule 52, an exclusion operation rule 54, an exclusion rule value 56, an exclusion value title 58, an exclusion rule description 60, an exclusion rule delete button 62, an exclusion rule edit/add button 64, an exclusion rule save and close button 66, and a plurality of exclusion rule entries, one of the entries is identified as element 51.

Element 161 is a presentation of an actual name of the oil and gas company shown in the profile name.

FIG. 7A is an editable classification rules display 28 according to an embodiment.

As shown in FIG. 7A, the editable classification rules can include at least one classification rule entry 29, seven are shown.

Additionally, the editable classification rules 28 can present an indication of the following: a classification comparison rule 30, a classification operation rule 32, a classification rule value 34, a classification title 36, a classification rule description 38, a classification rule delete button 40, a classification rule edit/add button 42, an edit/view classification list button 44, and a save and close button 46.

FIG. 7B depicts a resulting classification list 1010 that can occur when the edit/view classification list button 44 of FIG. 7A is actuated.

The classification list 1010 can include a classification name 1002, a description 1003, and at least one individual classification list entry 1009. In this Figure, four classification list entries are shown, the classification list entry 1009 has the name "well drilling data" the remaining entries have the names "health and safety", "maintenance" and "well key facts".

This FIG. 7B also displays the company name as the profile name 1001 for these individual classification list entries 1009.

The "edit . . . " button 1004 can be for each individual classification list entry. The "edit . . . " button can allow the individual classification entries 1009 to be edited. The "delete" button 1006 can allow an individual classification entry to be deleted. Each individual classification list entry can have a delete button.

The save and close button 46 can actuate computer instructions in the administrative data storage to save the classification list of individual entries for the named company of the profile name. The "add classification" button 1007 is a button that can actuate computer instructions, as mentioned earlier referencing FIGS. 3A-3C, which add an individual classification entry to the classification list.

FIG. 8 is a display of an edit and view classification list item.

As shown in FIG. 8, the edit and view classification list item display 174 can include a classification title 36, a classification rule description 38 for the displayed classification title, and a classification metadata display 175.

The classification metadata display 175 can contain at least one metadata rule entry 173.

Each metadata rule entry can have a metadata name 176, an example of which is shown as "site"; a metadata type 178, an example of which is shown as "number"; a format 181, an example of which is shown as "integer"; a metadata value 182, an example of which is shown as "SSYS size"; an insert reference button 184; and a classification metadata delete button 540.

FIG. 9 is a display of input settings 91 for inputs and outputs 103 according to an embodiment.

As shown in FIG. 9, the display of the inputs and outputs 103 for the migration profile can include a save and close button 46, a profile name 83, and an input settings title area 91.

The input settings display area 91 can present an input system type 93, an input data source environment 95, an input data source environment root path 97, and an include input data subfolders indicator 99.

FIG. 10 is a display of output settings 76 for inputs and outputs 103 according to an embodiment.

As shown in FIG. 10, the display of output settings 76 can include a save and close button 46, output system type field 78, an output system environment field 80, an output system data destination root path 82, an include output subfolders indicator 84, a radio button style indicator to indicate "prompt to rename manually" individual files 86, and a radio button style indicator to indicate "auto-remove invalid characters" 88.

FIG. 10 shows a migration profile name 83 in this example, "oil and gas company" to which these output settings 76 apply.

FIG. 11 is a display of the source/destination map settings 110 for the inputs and outputs 103 according to an embodiment.

The display of the source/destination map settings 110 can include a save and close button 46, and can display a migration profile name 83, a source repository 2, with a specific source repository indicated in box 113, a source control file 119, an include subfolders? indicator 121, a migrate based on destination rules? indicator 118, a destination repository 3, a map "add" button 122 connected to computer instructions of FIGS. 3A-3C, a map "view/edit" button 124, and a map "delete" button 126.

FIG. 12 is a display of an edit source/destination map according to an embodiment.

As shown in FIG. 12, the edit source destination map 130 can include a source repository 2 or destination repository 3 display.

Both displays can have a "this folder" indicator 166, and a "total folders" indicator 168.

The source repository 2 display can include an input system type 93 indicator. In this example the source system type indicator is "file share".

The source repository 2 display can include a source environment 107 indicator, which in this example is titled "local file share".

The source repository 2 display can include a source folder path 136 and a source browse button 138. This edit source/destination map includes an include data subfolders indicator 121, and a source reference file path 177, as well as a file path browse button 140.

FIG. 13 is a display of an edit source/destination map 130 showing a destination repository 3 display which shows the company name, which is the profile name of the profile migration.

As shown in FIG. 13, the edit source destination map 130 can include a source repository 2 or destination repository 3 display.

The destination repository 3 display can include the "this folder" indicator 166, and the "total folders" indicator 168.

The destination repository 3 display can include an output system type 78 which in this example is "File Share."

The destination repository 3 display can include a destination root path default 154, a destination folder name 156, and a full destination path 180.

FIG. 13 also shows the edit source/destination map 130 having a destination root map "browse" button 164, an "insert reference" button 160, and a destination rules button 179.

Also shown is the embodiment of a radio button which acts as an indicator to migrate content based on destination rules for this source indicator. This button is referred to as the "migrate content based on destination rules for this source location?" indicator 162.

FIG. 14 is a diagram of the steps of the method for accelerating electronic file migration from multiple sources to multiple destinations.

As shown in FIG. 14, Step 600 involves forming a dynamic rules generation library.

Step 602 involves creating a migration profile for the source material.

Step 604 involves creating a migration management console with at least one migration profile entry.

Step 606 involves forming an editable file inventory using metadata of the source material.

Step 608 involves applying exclusion rules of the migration profile to the editable file inventory.

Step 609 involves applying classification rules of the migration profile to the editable file inventory.

Step 610 involves applying input/output settings to the editable file inventory.

Step 616 involves simulating migration of metadata from a source repository to a destination repository using the configuration settings.

Step 618 involves verifying that the migration of the file inventory occurred with fewer than a preset quantity of client approved errors and if the errors were greater than the preset quantity of client approved errors, revising the migration profile changing the configuration settings.

Step 620 involves migrating the source material from the source repository to the destination repository after verification has occurred.

While these embodiments have been described with emphasis on the embodiments, it should be understood that within the scope of the appended claims, the embodiments might be practiced other than as specifically described herein.

What is claimed is:

1. A computer implemented electronic migration method for migrating source material comprising metadata and electronic file content from a source repository to a destination repository using an administrative processor with an administrative data storage connected to a network for communication with a client device connected to the network, wherein the computer implemented electronic migration method comprises:

forming a dynamic rules generation library in the administrative data storage connected to a processor on the network, wherein the dynamic rules generation library comprises:
  editable classification rules;
  editable exclusion rules;
  input settings for source material;
  output settings for source material; and
  source/destination map;

creating a migration profile for the source material using computer instructions in the administrative data storage for use in migrating the source material with metadata from the source repository to the destination repository; wherein the migration profile comprises:
  a profile name;
  a migration profile description;
  configuration settings;
  an editable file inventory of the metadata of the source material;

applying configuration settings to the migration profile;

storing information from the destination repository in the administrative data storage to be used for performing a simulation of a migration using metadata of the source material and for a migration of the source material with metadata;

performing the simulation using information stored in the administrative data storage and metadata of the source material and the migration profile, wherein the migration profile includes: migration profile names, configuration settings, and the editable file inventory of the metadata of the source material;

forming a visualization of the destination repository based on the simulation including input/output settings, editable classification rules and editable exclusion rules of the dynamic rules generation library with a progress log of a list of sequence status of activities performed during the simulation, wherein the visualization presents a result of the simulation to a user on a display;

performing an editable file inventory analysis using metadata after the visualization is formed and applying editable exclusion rules, editable classification rules, and input/output settings;

verifying that the editable file inventory analysis and the progress log enable the simulation to be performed with metadata and that the simulation with metadata is within the editable classification and the editable exclusion rules based on the input/output settings and the source destination map;

updating the metadata stored in the editable file inventory using predefined file migration objectives in the administrative data storage and updating the visualization of the destination repository using the editable file inventory analysis and editing the editable file inventory;

after the simulation with metadata and updating occurs, using computer instructions configuring the administrative processor to initiate a source material migration using the migration profile and the metadata of the source material and forming the progress log from the simulation for the source material migration that provides a last sequence status of activities performed during the source material migration; and displaying, on the client device, a migration management console comprising the migration profile and the progress log, wherein the migration management console is displayed as the simulation runs and as the source material migration runs.

2. The computer implemented method of claim 1, further comprising the steps:

simulating migration from a source repository to a destination repository using only the metadata and the migration profile; and verifying that the source material migration occurred with fewer than a preset quantity of client approved errors and if the errors were greater than the preset quantity of client approved errors, revising the migration profile and changing the configuration settings.

3. The computer implemented method of claim 1, further comprising using computer instructions to cause the processor to audit entries by compiling and displaying information relating to changes made by the user to the migration profile.

4. The computer implemented method of claim 1, further comprising using computer instructions to cause the processor to create and display an analysis report comprising information about the migration management console.

5. The computer implemented method of claim 1, wherein the apply settings include an apply input/output settings, apply exclusion rules and computer instructions to cause the processor to apply input/output settings to the source material, cause the processor to use computer instructions to apply exclusion rules to the source material, and cause the processor to apply exclusion rules to the source material.

6. The computer implemented method of claim 1, further comprising using computer instructions to cause the processor to remove the source material excluded by the configuration settings.

7. The computer implemented method of claim 1, wherein the migration management console comprises:
the migration profile description;
a migration profile creation date;
an input system type;
an output system type; and
a create new profile button connected to computer instructions to create a new migration profile.

* * * * *